Patented Sept. 29, 1925.

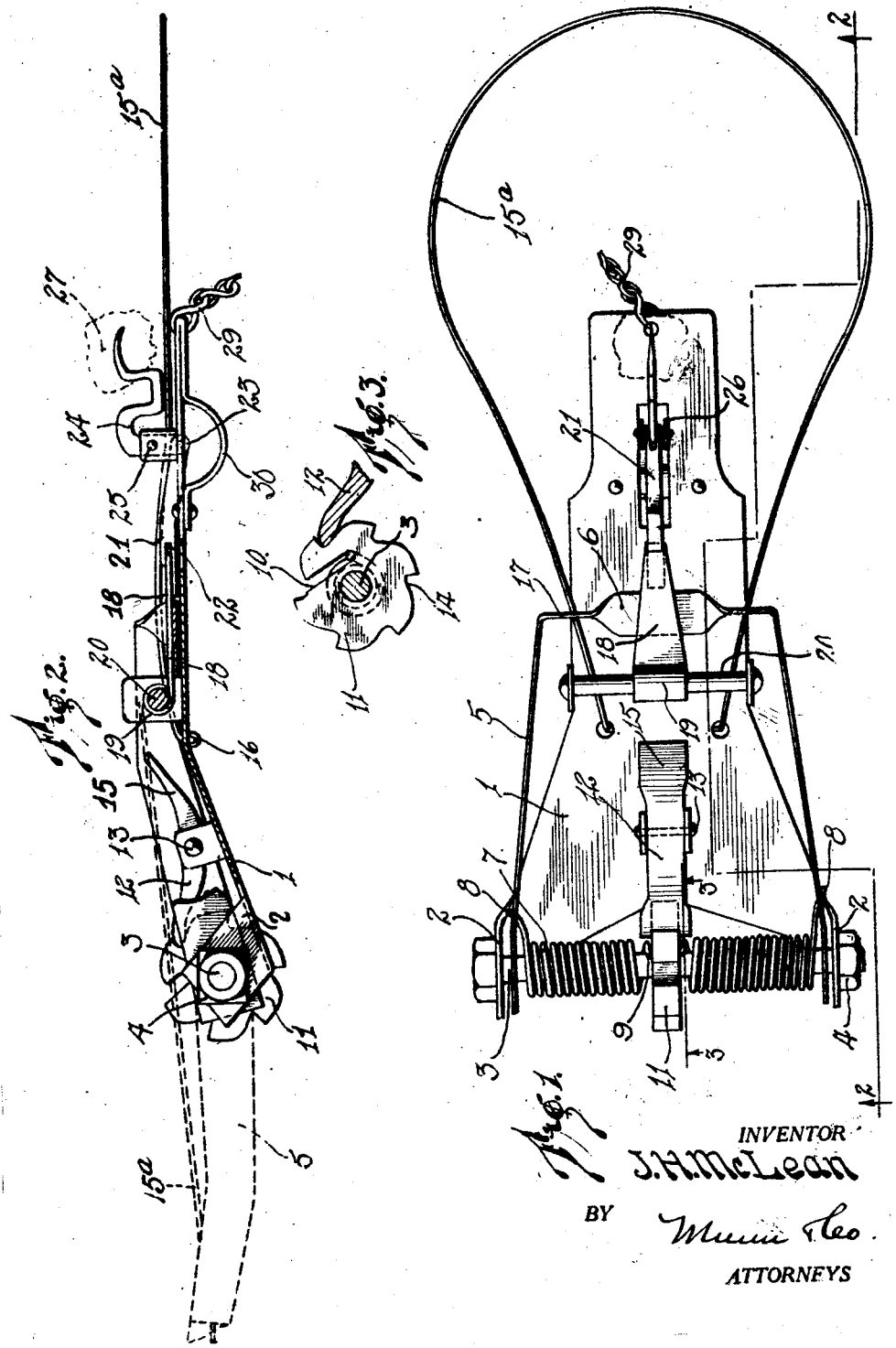

1,555,133

UNITED STATES PATENT OFFICE.

JOHN HARVEY McLEAN, OF CLARK, WYOMING, ASSIGNOR OF ONE-HALF TO MATT WAGNER, OF CLARK, WYOMING.

ANIMAL TRAP.

Application filed May 26, 1924. Serial No. 715,975.

*To all whom it may concern:*

Be it known that I, JOHN HARVEY MC-LEAN, a citizen of the United States, and a resident of Clark, Park County, Wyoming, have invented a new and useful Improvement in Animal Traps, of which the following is a full, clear, and exact description.

My invention relates to improvements in animal traps, and it consists in the combinations, constructions, and arrangements herein described and claimed.

An object of my invention is to provide a trap of the type described which is intended to strangle the animal caught thereby, and thus relieve suffering as is usually the case with the ordinary type of spring jaw trap, which only apprehends the animal but does not attempt in any way to take its life. In a country where numerous traps are set at considerable distances from the trapper's place of lodging, it is often necessary for animals to remain caught in the trap for many days, and unnecessarily suffer.

A further object of my invention is to provide a trap of the type described which is operated by a bait carrying trigger much in the same manner as the ordinary type of spring jaw trap, and in which a loop, snare, or the like encircles the throat of the animal, as when the bait trigger is actuated, there being means associated with the snare for drawing the loop tight about the throat of the animal and thereby causing immediate death.

A further object of my invention is to provide a trap of the type described in which means is provided for varying at will the force for drawing the looped snare about the throat of the animal so that the trap may be set for various animals.

A further object of my invention is to provide a device of the type described that is simple in form, durable, and thoroughly efficient for the purpose intended.

Other objects and advantages will appear in the following specification, and the novel features of the invention will be particularly pointed out in the appended claims.

My invention is illustrated in the accompanying drawings, forming part of this application, in which—

Figure 1 is a top plan view of an embodiment of my invention.

Figure 2 is a sectional view along the line 2—2 of Figure 1, and showing bait and the trap sprung, in dotted lines, and Figure 3 is a sectional view along the line 3—3 of Figure 1.

In carrying out my invention I make use of a base member 1 of metal having a pair of upwardly extending portions 2 forming cooperating bearing members for a stationary shaft 3 projected therethrough. This shaft 3 in practice may be a long machine bolt having a nut 4 at one end, by means of which the shaft so formed may be held tightly in place upon the bearing members 2.

A U-shaped member 5 is pivotally mounted upon the shaft 3 and has a portion of its outermost end bent substantially parallel with the base 1 when the member 5 is in the position shown in Figure 1. This bent portion is indicated at 6. A torsion spring 7 is disposed concentric with the shaft 3 and its outer ends 8 are engaged with the U-shaped member 5 by bending a portion of the ends 8 under the adjacent portions of the member 5.

The mid portion 9 of the torsion spring 7 is projected through the slot 10 formed in a ratchet wheel 11 rotatably mounted upon the shaft 3, so that rotation of the ratchet wheel 11 in a counterclockwise direction, (see Figure 3) will increase the tendency of the spring 7 to lift the U-shaped member 5 from the position shown in Figure 1 and move it toward the position shown in dotted lines of Figure 2.

A manually actuated pawl 12 pivotally mounted at 13 upon the base member 1 is arranged to normally engage with the teeth 14 of the ratchet wheel 11. When the rearmost part 15 of the pawl 12 is pressed downwardly, the pawl will move out of engagement with the ratchet wheel 11 and permit the spring 7 to restore the wheel to its original position, thereby relieving the U-shaped member 5 of pressure ordinarily applied thereto by the spring.

A looped snare 15$^a$ of flexible wire is attached at 16 to the base 1. The wire loop is first threaded in openings in the outermost end 17 of the U-shaped member 5.

Obviously this construction must cause the constriction of the looped snare 15$^a$ as the U-shaped member 5 is moved upon the shaft 3 toward the position shown in Figure 2, and that if the spring 7 is tight enough, the loop 15ᵃ may be drawn sufficiently tight to strangle an animal caught therein in the manner heretofore described.

Means for holding the U-shaped member 5 against the force of the spring 7 until the bait has been touched is provided in a latch lever 18 pivotally mounted at 19 upon a shaft 20. The shaft 20 is secured to the base 1 and the lever 18 is arranged to overlie the portion 6 of the U-shaped member 5. A sliding pawl 21 is provided with a slot 22, (see Figure 2) at one end for receiving the catch lever 18, and is pivotally secured at its opposite end 23 to a bait trigger 24, which in turn is pivotally mounted at 25 upon upstanding lugs 26. The lugs 26 are formed integral with the base 1.

When bait 27, as shown in dotted lines, placed upon the trigger 24, is moved upwardly, the sliding pawl 21 will move out of engagement with the catch member 18 and thus permit the U-shaped member 5 to move by virtue of the spring 7.

A chain 29 is provided by means of which the base member 1 may be fixed to a stake or the like, and driven into the ground. A metal leg 30 formed beneath the base 1 may serve to elevate that end of the trap, and to protect the member 24.

From the foregoing description of the various parts of the device, the operation thereof may be readily understood. In setting my improved animal trap, the ratchet wheel 11 is rotated manually in a counterclockwise direction, (see Figure 3), until the spring 7 has been tightened to a degree sufficient to cause the looped snare 15ᵃ to actuate efficiently for the particular animal for which the trap is used. Obviously small creatures would not require a great deal of force applied to the snare, whereas if the trap is to be used for a larger and stronger animal, the spring 7 should be tightened by several turns of the wheel 11. The pawl 12 will effectively prevent the return of the wheel to its original position.

The U-shaped member 5 is then moved to the position shown in Figure 1. The latch lever 18 is moved over the portion 6 and the sliding bolt 21 is engaged with the lever 18. The bait 27 is then placed upon the trigger 24 and the device is ready for use. When the animal has approached the trap, and attempts to devour the bait, his head must be over the snare 15ᵃ. As quickly as the bait 27 has been moved sufficiently to cause a slight movement of the trigger 24, the latch lever 18 will be free and the U-shaped member 5 will assume the position shown in dotted lines in Figure 2. This will cause the looped snare 15ᵃ to move about the throat of the animal and choke the animal sufficiently to cause death.

It is believed that this type of trap is far more humane than the ordinary type of trap, which usually causes long hours of unnecessary suffering to the animal apprehended thereby.

My improved trap is set when the parts thereof assume the position shown in full lines of Figure 2 and placed near a clump of bushes, tree trunks, or other natural barrier. The looped snare 15ᵃ is placed adjacent to the natural barrier so that the animal must approach the bait 27 with his head facing the loop.

When the bait is moved so as to release the latch lever 18 the looped snare 15ᵃ will move over the head of the animal by virtue of the movement of the U-shaped member 5, toward the animal, on its axis 3. The animal will be caught with its neck between the outermost portion of the loop 15ᵃ, and the bent portion 6 of the U-shaped member 5, thus assuring strangling of the animal if the spring 7 is wound tight, or holding the animal without strangling, against removal of its head from the trap, if the spring is not wound tight. I thus provide a trap by means of which an animal may be either instantly strangled to death in a humane manner or held by the head until apprehended, as in cases when the trap is visited at frequent intervals.

I claim:

1. An animal trap of the character described comprising a loop snare fashioned to permit the introduction of the head of an animal therethrough, adjustable means for constricting said loop snare, a bait trigger for actuating said named means, and said means being further constructed so as to move the entire snare upwardly away from the ground as said snare is constricted, and thereafter moving said snare toward the ground.

2. An animal trap of the character described comprising a looped snare fashioned to permit the introduction of the head of an animal therethrough, adjustable means for constricting said looped snare, a bait trigger for actuating said means, said means including a pivotally mounted member having an opening therethrough through which said looped snare is threaded, and a spring for moving said U-shaped member away from the base of said looped snare, whereby the snare follows said U-shaped member when the outermost portions thereof engage with the adjacent portions of the U-shaped member to tightly encompass the neck of the animal.

JOHN HARVEY McLEAN.